March 3, 1931. J. W. WHITE 1,794,564
WHEEL
Filed June 19, 1922
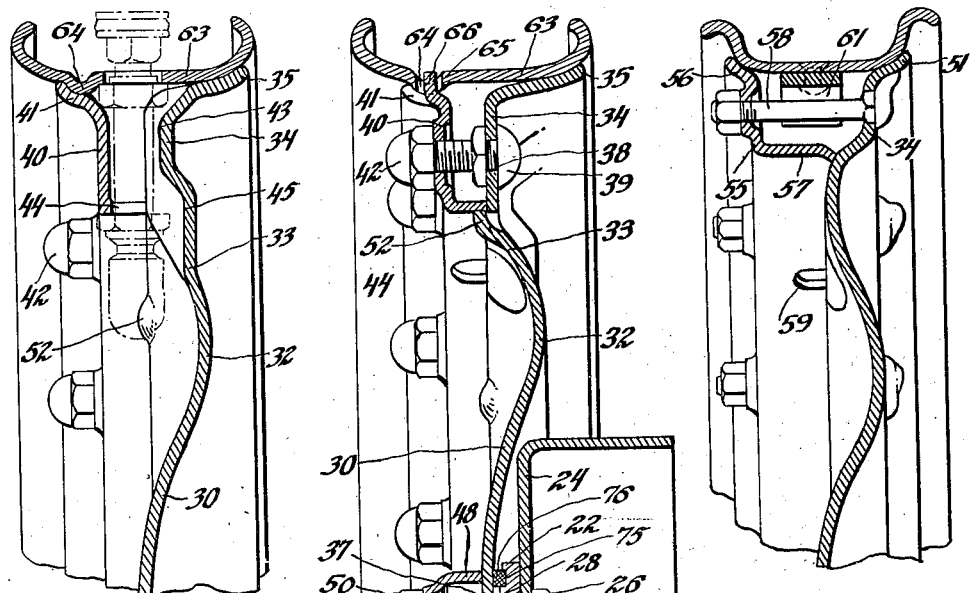
Inventor
John W. White
By his Attorney
Lloyd Blackmore Patented Mar. 3, 1931

1,794,564

UNITED STATES PATENT OFFICE

JOHN W. WHITE, OF BUFFALO, NEW YORK, ASSIGNOR TO KELSEY-HAYES WHEEL CORPORATION, OF DETROIT, MICHIGAN, A CORPORATION OF NEW YORK

WHEEL

Application filed June 19, 1922. Serial No. 569,384.

The invention relates to improvements in wheels, as described in the present specification and illustrated in the accompanying drawings that form part of the same.

The invention consists essentially of the novel arrangement and construction of parts as hereinafter more fully described.

The objects of the invention are to devise a wheel of the metal disc type demountably supported at the hub to permit flexure of the disc and dissipation of lateral stresses, thereby insuring durability to the metal of the disc.

Further objects of the invention are to arrange the major portion of the disc inside the median line of the tire supporting portions, whereby a tire valve stem may extend radially inward on the outer side of the disc.

Other objects will appear as the invention is described.

In the drawings, Figure 1 is a cross sectional view of the hub and upper half of the wheel.

Figure 2 is a detail cross sectional view of the wheel rim showing the valve stem opening.

Figure 3 is a detail cross sectional view showing one-half the disc arranged to receive a "straight side" type demountable rim.

Referring to the drawings, the invention is shown applied to a three-quarter float type of motor vehicle axle, that is, one in which bearings are arranged to take the end thrust in both directions, though it will appear from the following description that the disc and parts thereof are equally applicable to a hub and axle mounting of other types of axles, such as those commonly referred to as semi, or full floating.

Like numerals of reference indicate corresponding parts in each figure.

In the drawings, the axle housing 10 has the inner shoulder 11 formed by the brake supporting member 12, and against which the inner race 13 of a double row bearing is clamped by the nut 14 on the outer end of said housing 10.

The axle 15 has the hub 16 secured on the tapered end thereof by the nut 17 as customary in such axle constructions.

The hub 16 has the circumferential flange 22 adjacent the inner end thereof, and further is enlarged at 18 on the interior of the inner end to form the shoulder 19 and receive the outer races 20 of the bearing, said races abutting the shoulder 19, and being held in said recess by the circular plate 21 secured to the flange 22 by a number of bolts, such as that shown at 23, equally spaced at desired intervals about the flange.

It will also be noted that the bolts 23 serve to secure the brake drum flanges 24 between the plate 21 and the hub flange 22, and therefor serve to secure the hub and axle assembly together independent of the disc or rim mounting of the wheel as hereinafter described.

The plate 21 between the bolts 23 is cut away as shown at 25 to accommodate the nuts 26 threaded onto the inner ends of the studs 27, which pass through the flange 22, and have the enlarged portions 28 engaging the outer face of the flange 22, and the threaded outer ends 29 to receive the disc 30 of the wheel.

The disc 30 may vary in contour but is shown in Figures 1 and 2 with a flat hub zone 31 bordered by an inwardly dished zone, which merges into an outwardly dished zone 33, extending to a peripheral ring 34, and terminates in an inwardly extending rim supporting flange 35.

The disc 30 has the orifices 36 therethrough at intervals about the hub zone 31, corresponding to the bolts 23, and the orifices 37 corresponding to the studs 27, and fitting the enlarged portion 28 for driving purposes.

At the peripheral ring portion the disc has the orifices 38 in which the bolts 39 are secured with the threaded ends extending outwardly through corresponding orifices in the outer ring 40, having an outwardly extending rim supporting flange 41 formed complementary to the flange 35, and thus completing the support for the tire rim; the said ring 40 resting on the lugs 52 punched outwardly from the disc at circumferential intervals.

The outer ends of the bolts 39 are fitted with the nuts 42 whereby the outer flange may be separated from the inner one for mounting a tire rim 63.

The tire rim 63 is of the "clincher" type, and has the inwardly extending peripheral bead 64 against which the flange 41 of the ring 40 abuts to force the rim 63 against the flange 35 of the disc. The rim 63 also has the notch 65 in the bead 64, into which the tongue 66 of the ring 40 extends for driving purposes.

In Figure 2 the ring 34 of the disc is shown depressed at 43 to form a radial valve stem passage, and the web portion of the disc is also preferably depressed inwardly at 45 adjacent the depression 43 to accommodate the valve stem nut or a tire inflating chuck and the outer ring 40 is notched at 44 to pass about the valve stem.

The disc as above described is secured to the hub of the wheel by a hub ring 46, having the inwardly extending inner and outer flanges 47 and 48 respectively bearing against the flat hub zone of the disc adjacent the inner and outer peripheries of the hub flange 22, and it will be noted that the hub flange 22 is inwardly recessed at 74 and 75 opposite the outer hub ring flanges 47 and 48, and rings of friction material 76, preferably with a little resiliency, are embedded in said recesses.

The disc 30 and hub ring 46 are secured in place by the acorn nuts 49 fitting the outer threaded ends 29 of the stubs 27 which pass through suitable orifices 50 in said hub ring 46. The disc, both front and back, is thus firmly clamped about the hub on two circles and the lateral stresses, which ordinarily fatigue the metal immediately outside the clamped hub portion, are relieved through the outer clamped circle, and absorbed in the resiliency permitted the zone of metal between said outer and the inner clamped circle in a manner somewhat similar to the action of a cantilever type of leaf spring, the resiliency of the rings of friction material aiding in this respect.

The entire wheel is reduced to a minimum number of parts and extreme light weight, and withal the tire rim may be demounted without removing the wheel from the axle, or in turn the disc may be demounted by removing the acorn nuts 49; and again the hub and brake drum may be demounted by removing the nuts on the outer ends of the bolts 23 without disturbing the bearing as mounted on the axle housing.

In Figure 3 of the drawings the disc is formed to support a "straight side" type of demountable tire receiving rim, and for this purpose the disc is flanged inwardly at 51, and a retaining ring 55, having the out-turned flange 56, and the in-turned flange 57 is secured to the disc ring by the bolts 58, the out-turned flange supporting the rim and the in-turned flange abutting the disc adjacent the ring 34.

A valve stem notch 59 is shown in the ring 55, and a saddle bracket 61 is secured to the rim and contacts with one of the bolts 58 for driving.

The disc as shown is preferably arranged inside the median plane of the tire at the rim supporting part, and this is very desirable to expose and permit the use of a straight valve stem for assembly or inflation purposes.

It will be understood that various changes in details of construction may be made without departing from the spirit and scope of the invention, and therefore I do not wish to be limited to the specific structure shown.

I claim:

1. A wheel comprising, in combination, a hub, a metal disc attachable to said hub and extending radially and inwardly whereby an inwardly flanged peripheral portion thereof is wholly inward of the medial plane of the wheel, a second peripheral and outwardly flanged ring portion attachable to said disc on the median plane, whereby a rim and tire may be supported on the peripheral portions of said disc and ring, said tire having a straight stem valve extending between said disc and ring, and clear of the outer face of said disc.

2. In a disk wheel, the combination of a hub, a rim adapted to carry a pneumatic tire with a substantially straight valve stem, and a dished disk connecting the hub and rim, the disk uniformly dished in its body portion as viewed concentrically of the hub and shaped in its outer portion to form a seat for one side of the rim and to accommodate the valve stem wholly in front thereof.

3. In a disk wheel, the combination of a hub portion, a rim portion adapted to carry a pneumatic tire equipped with a straight valve stem, and a disk portion, the body of the disk having a front contour generated by the revolution about the wheel axis of a line angularly projected therefrom, said disk being shaped in its peripheral portion to form a seat for one side of the rim and to accommodate the valve stem wholly in front thereof.

4. In a disk wheel, the combination of a hub portion, a rim portion adapted to carry a pneumatic tire equipped with a straight valve stem and a dished disk portion, the body of the disk having a front contour generated by the revolution about the wheel axis of a line curved in the plane of the axis and angularly projected therefrom, said disk being shaped in its peripheral portion to form a seat for the rim and to accommodate the valve stem wholly in front thereof.

5. In a disk wheel, the combination of a hub portion, a disk body portion, a demountable rim adapted to carry a pneumatic tire equipped with a substantially radial valve stem, and a rim-retaining element bearing upon the front of the rim and of the disk, the valve stem lying wholly in front of the disk and the outer portion of the rim-retaining element lying in front of the valve stem but leaving the inflation end of the same exposed inwardly from said element.

6. In a disk wheel, the combination of a hub portion, a disk body portion, a demountable rim adapted to carry a pneumatic tire equipped with a substantially radial valve stem, and a rim-retaining element bearing upon the front of the rim and of the disk, the valve stem lying largely between the disk and the rim-retaining element but with its inflation end disposed in front of the disk radially inward from the rim-retaining element.

7. In a disk wheel, the combination of a hub portion, a disk body portion, a demountable rim adapted to carry a pneumatic tire equipped with a substantially radial valve stem, and a rim-retaining element bearing upon the front of the rim and of the disk, the valve stem lying wholly in front of the disk and the outer portion of the rim-retaining element lying in front of the valve stem but having the continuity of its inner portion interrupted to permit the valve stem to extend from behind the said element to a point radially inward therefrom.

In testimony whereof I affix my signature.

JOHN W. WHITE.